(12) United States Patent
Khoo et al.

(10) Patent No.: US 10,832,575 B2
(45) Date of Patent: Nov. 10, 2020

(54) NETWORK CONNECTED PARKING SYSTEM

(71) Applicant: Toyota Motor North America, Inc., Plano, TX (US)

(72) Inventors: Wilson-Boon Siang Khoo, Allen, TX (US); Devang Parekh, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/209,049

(22) Filed: Dec. 4, 2018

(65) Prior Publication Data

US 2020/0175869 A1 Jun. 4, 2020

(51) Int. Cl.
| | |
|---|---|
| G08G 1/14 | (2006.01) |
| G01C 21/34 | (2006.01) |
| G01C 21/36 | (2006.01) |
| H04W 4/40 | (2018.01) |

(52) U.S. Cl.
CPC .......... G08G 1/143 (2013.01); G01C 21/3415 (2013.01); G01C 21/3685 (2013.01); H04W 4/40 (2018.02)

(58) Field of Classification Search
CPC .......................... G08G 1/148; G08G 1/096791
See application file for complete search history.

(56) References Cited

U.S. PATENT DOCUMENTS

| | | | |
|---|---|---|---|
| 8,612,137 B2 | 12/2013 | Harris et al. | |
| 8,655,587 B2 | 2/2014 | Kandal | |
| 9,275,546 B2 | 3/2016 | Aravkin et al. | |
| 9,418,550 B2 | 8/2016 | Geelen | |
| 9,443,428 B2 | 9/2016 | Amir | |
| 9,536,428 B1 | 1/2017 | Wasserman | |
| 9,652,986 B2 | 5/2017 | Belzner et al. | |
| 9,672,741 B2 | 6/2017 | Scofield | |
| 9,747,797 B1 | 8/2017 | Ghosh et al. | |
| 9,759,569 B2 | 9/2017 | Trum | |
| 9,857,182 B2 | 1/2018 | Huijen et al. | |
| 2002/0161520 A1* | 10/2002 | Dutta | G01C 21/26 701/469 |
| 2008/0048885 A1 | 2/2008 | Quinn | |

(Continued)

FOREIGN PATENT DOCUMENTS

DE 102017201242 11/2017

*Primary Examiner* — Omeed Alizada
(74) *Attorney, Agent, or Firm* — Snell & Wilmer LLP (57) ABSTRACT

Methods and systems for alerting a driver of a vehicle of parking conditions within a predetermined distance of a destination. The system includes a transceiver of the vehicle configured to receive, from one or more other vehicles, parking condition data including one or more indicators of parking conditions within the predetermined distance of the destination. The system also includes an electronic control unit (ECU) of the vehicle connected to the transceiver. The ECU is configured to determine a parking congestion level based on the parking condition data. The ECU is also configured to determine whether the parking congestion level exceeds a threshold parking congestion level. The ECU is also configured to instruct an output device to alert the driver of parking congestion near the destination when the parking congestion level exceeds the threshold parking congestion level.

17 Claims, 7 Drawing Sheets

(56) References Cited

U.S. PATENT DOCUMENTS

| | | | |
|---|---|---|---|
| 2009/0204319 A1* | 8/2009 | Shanbhag | G01C 21/3423 |
| | | | 701/533 |
| 2012/0200430 A1 | 8/2012 | Spahl | |
| 2014/0285362 A1* | 9/2014 | Choi | G08G 1/14 |
| | | | 340/932.2 |
| 2015/0124096 A1* | 5/2015 | Koravadi | G06K 9/00825 |
| | | | 348/148 |
| 2016/0111004 A1 | 4/2016 | Delmas | |

* cited by examiner

NETWORK CONNECTED PARKING SYSTEM

BACKGROUND

1. Field

The invention relates to a system and a method for gathering and providing parking information to vehicles.

2. Description of the Related Art

Conventional navigation systems are unable to provide information about the specific parking situation in a given area. In many instances, a driver will arrive at a destination and may discover that there is no parking or parking spaces available. The driver may traverse the surrounding areas of the destination location in search of available street parking or a parking lot. This may require a significant amount of effort on the part of the driver. While in search of a parking spot, the driver may become disoriented relative to the destination location and may end up parking in a location that is much farther from the destination location than desired. In some situations, a driver may enter a parking lot only to discover that there are no available parking spots remaining. The task of parking a vehicle may sometimes be a non-trivial chore. Accordingly, there is a need for improved parking systems and methods.

SUMMARY

What is described is a system for alerting a driver of a vehicle of parking conditions within a predetermined distance of a destination location. The system includes a transceiver of the vehicle configured to receive, from one or more other vehicles, parking condition data including one or more indicators of parking conditions within the predetermined distance of the destination location. The system also includes an electronic control unit (ECU) of the vehicle connected to the transceiver. The ECU is configured to determine a parking congestion level based on the parking condition data. The ECU is also configured to determine whether the parking congestion level exceeds a threshold parking congestion level. The ECU is also configured to instruct an output device to alert the driver of parking congestion near the destination location when the parking congestion level exceeds the threshold parking congestion level.

Also described is a system for determining a suggested parking location for a vehicle travelling from a start location to a destination location. The system includes a transceiver of the vehicle configured to receive, from one or more other vehicles, parking condition data including one or more indicators of parking conditions along a route between the start location and the destination location, and/or one or more indicators of parking conditions within a predetermined distance of the destination location. The system also includes an electronic control unit (ECU) of the vehicle connected to the transceiver. The ECU is configured to determine a plurality of candidate parking locations based on the parking condition data. The ECU is also configured to determine the suggested parking location from the plurality of candidate parking locations based on a comparison of each of the candidate parking locations in the plurality of candidate parking locations. The ECU is also configured to determine a new route between the start location and the suggested parking location.

Also described is a method for determining a suggested parking location for a vehicle travelling from a start location to a destination location. The method includes receiving, by a transceiver of the vehicle, from one or more other vehicles, parking condition data including one or more indicators of parking conditions along a route between the start location and the destination location, and/or one or more indicators of parking conditions within a predetermined distance of the destination location. The method includes determining, by an electronic control unit (ECU) of the vehicle, a plurality of candidate parking locations based on the parking condition data. The method includes determining, by the ECU, the suggested parking location from the plurality of candidate parking locations based on a comparison of each of the candidate parking locations in the plurality of candidate parking locations. The method also includes determining, by the ECU, a new route between the start location and the suggested parking location.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for gathering and distributing parking information to vehicles. Conventional navigation systems do not provide a driver of a vehicle with information regarding parking availability in and around the destination location. As used herein, "driver" may refer to a human being driving the vehicle when the vehicle is a non-autonomous vehicle, and/or "driver" may also refer to one or more computer processors used to autonomously or semi-autonomously drive the vehicle.

The systems and methods described herein use sensors of other vehicles and/or the parking area or structure to gather parking data, and the gathered parking data is used to provide an indication to the vehicle of real-time parking conditions. This distributed manner of collecting the parking data distributes the computational load on the system as a whole and provides accurate information to the vehicle. The systems and methods described herein allow the vehicle to gain insight into the current parking conditions of a given location without having to be there. By having this parking information prior to arriving at a destination location, the vehicle is able to efficiently find parking, thereby avoiding contributing to the traffic congestion at the destination location. In this way, the systems and methods described herein reduces traffic congestion, which reduces traffic collisions, which improves overall safety of the vehicles near the destination location.

Figure 1:
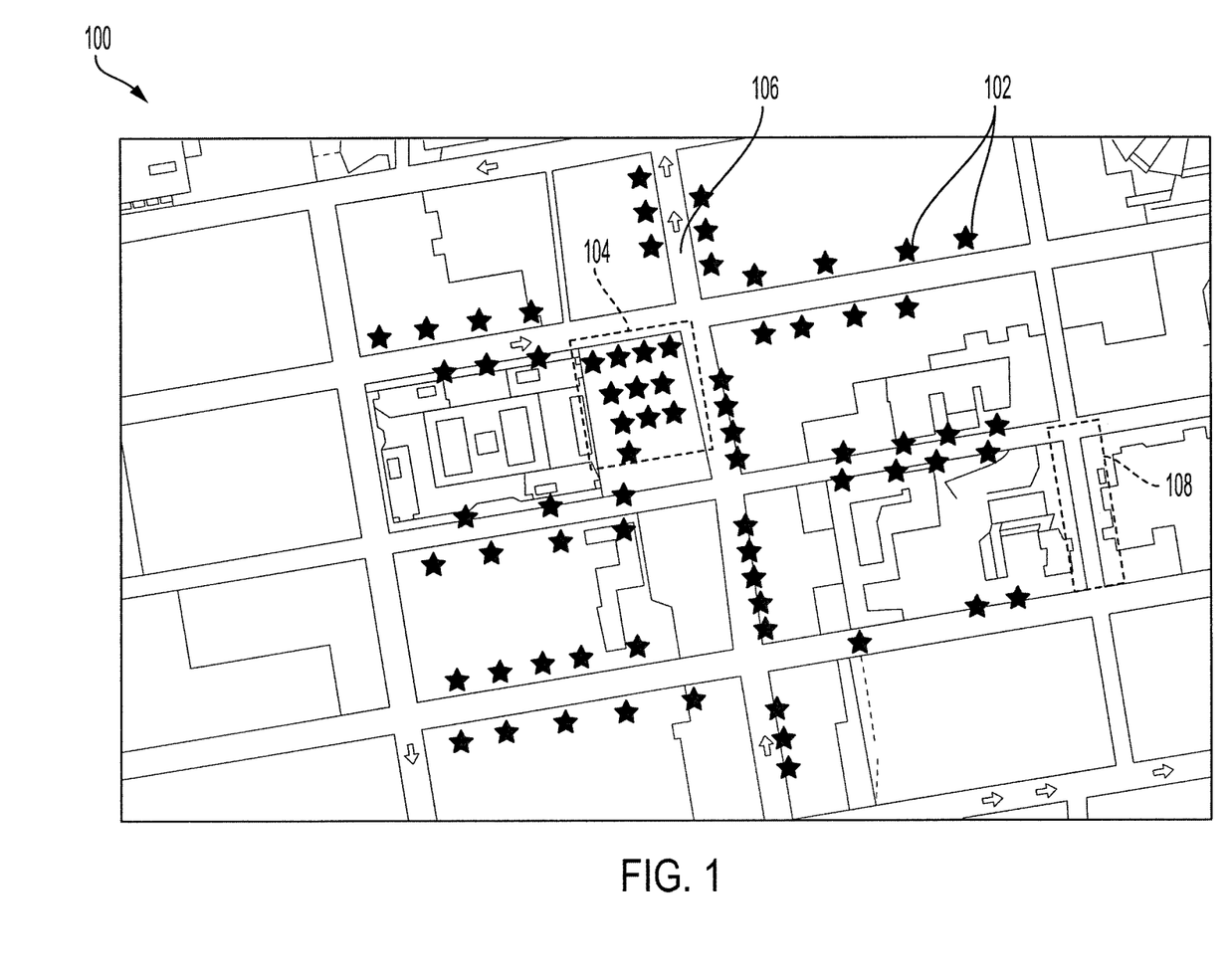
FIG. 1 illustrates traffic condition data including vehicle location data, according to various embodiments of the invention.

FIG. 1 illustrates an area 100 and vehicles 102. The vehicles 102 may be parked vehicles or moving vehicles. By knowing the location of the vehicles 102 in a given area, the parking conditions of the area may be determined. Each vehicle 102 may use a location sensor, such as a GPS unit, to determine the location of the vehicle. In some embodiments, the vehicles 102 include an onboard computing device that communicates the location of the vehicle to one or more other vehicles or computing devices. In some embodiments, the vehicles 102 are associated with a mobile computing device, such as a smartphone, and the mobile computing device communicates the location of the vehicle to one or more other vehicles or computing devices.

Parking condition data may be determined based on the vehicle location data in the area 100. Parking condition data may include parking congestion status, parking regulations, parking lot locations, and/or open parking location data. The congestion of multiple vehicles 102 within a non-street area 104 indicates that there is likely a parking structure in the non-street area 104. The lining up of vehicles on the right side of the street 106 indicates that there is likely a parking restriction on the left side of the street 106, given the congestion of the area 100. The congestion of parking within the area 100 indicates that there are likely few, if any, open parking spaces. The systems and methods described herein may analyze this vehicle location data of area 100 and may determine a suggested parking area 108 that is not as congested. The more vehicles and computing devices that participate in the systems and methods described herein, the more accurate the parking condition data will be.

Map data of the area 100 may be used to supplement the vehicle location data provided by the vehicles 102. The map data may include portions of the streets that may be used for parking. The map data may also include street directionality, to identify one-way streets and two-way streets. The map data may also include any known restrictions on parking. Restrictions on parking may include parking restrictions based on time (e.g., no parking between 8 AM and 8 PM), day (e.g., no parking on Wednesdays), size (e.g., no vehicles with more than two axles), or any other conditions.

The vehicle location data may be shown by a display screen within the vehicle to illustrate to a user or a driver of the vehicle, the current state of parking congestion. Showing the vehicle location data on a display screen may assist in persuading the user or the driver to park in an area away from the congestion, such as area 108. In some embodiments, other output devices may be used to communicate parking congestion to the driver, including audible alerts from a speaker or tactile alerts from a vibration device.

In some embodiments, the vehicle determines a parking congestion level based on the parking condition data. The parking congestion level may be a value associated with the parking conditions within a predetermined distance of the destination location. As an example, a parking congestion value of 10 means that there are very few parking spaces near the destination location that are available and a parking congestion value of 1 means that there are a lot of parking spaces near the destination location that are available.

When the parking congestion level does not exceed a threshold parking congestion level (e.g., 8), the vehicle may not provide an alert to the driver. However, when the parking congestion level does exceed the threshold parking congestion level, the alert may be provided to the driver. In this way, relatively low levels of parking congestion are not brought to the driver's attention, as relatively low levels of parking congestion may not result in difficulty finding parking at or near the destination location.

In addition to the current location of the vehicles, the speed of the vehicles travelling in the area may be used to determine the parking condition data and any suggested parking locations.

Figure 2:
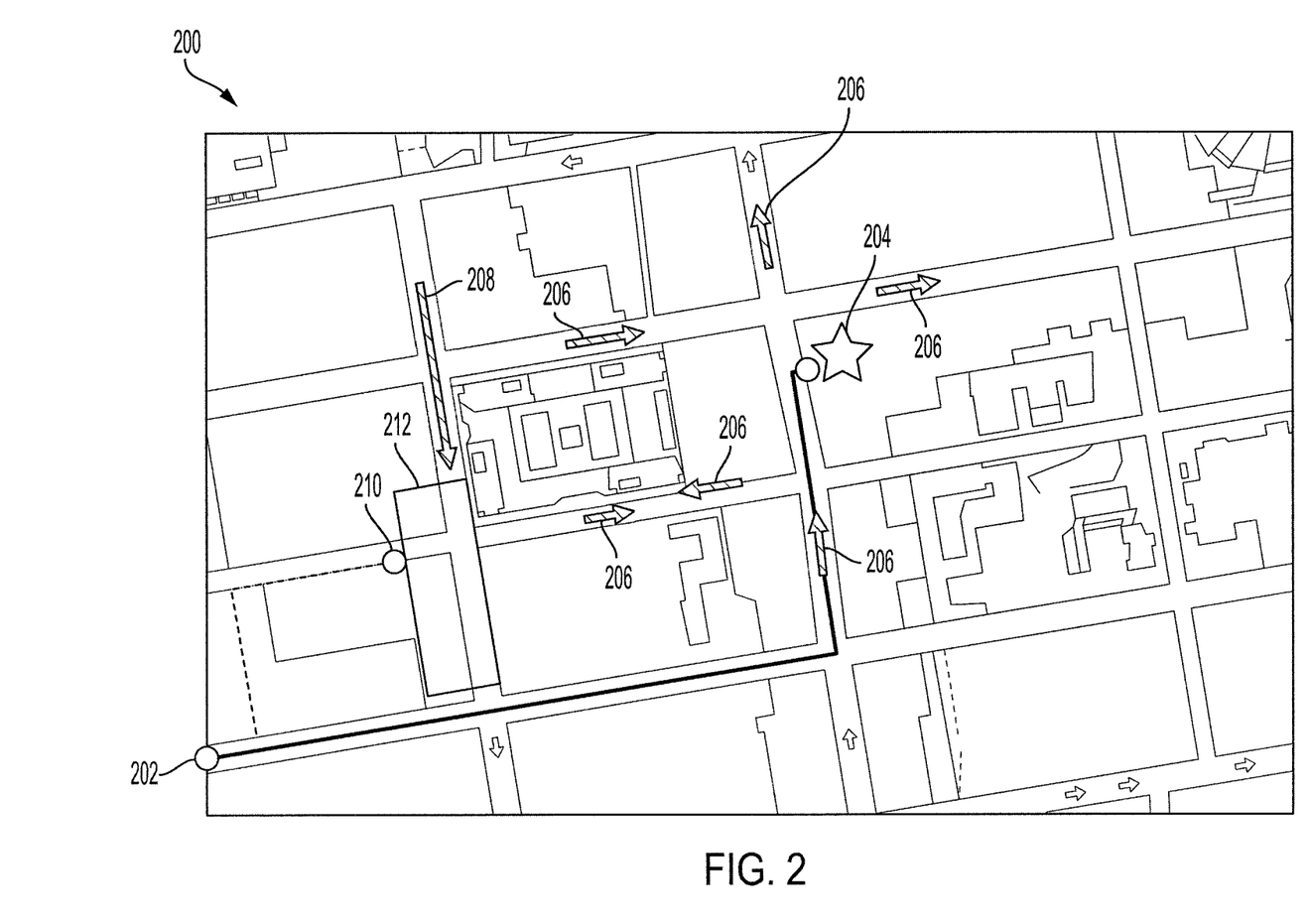
FIG. 2 illustrates traffic condition data including vehicle speed data and suggestion of an alternate parking location, according to various embodiments of the invention.

FIG. 2 illustrates area 200, which is the same area 100 illustrated in FIG. 1, but with vehicle speed arrows indicating the speed of vehicles travelling along the streets of the area. The vehicles travelling along the streets of the area 200 may have a speed sensor configured to detect the speed of the vehicle. The vehicles may also be configured to communicate the speed of the vehicle to one or more other vehicles or computing devices.

The length or size of the arrows may indicate a speed of the vehicles travelling along the street. For example, the shorter arrows 206 indicate that the vehicles travelling along the respective streets are travelling at a relatively low speed, while the longer arrow 208 indicates that the vehicles travelling along the respective street are travelling at a relatively high speed. In some embodiments, colors may be used (e.g., green for relatively fast conditions, red for slow conditions, and yellow for speed conditions in between).

The vehicle speed data may be used to provide routing and parking recommendations to the driver of a vehicle. As illustrated in FIG. 2, the driver of the vehicle may be navigated from a starting point 202 to a destination point 204. The shorter arrows 206 around the destination point 204 indicate that there may be congestion around the destination point 204. This may make the area around the destination point 204 a non-desirable area to seek parking—there may not be parking available around the destination point 204, and even if there were, the congestion of the area around the destination point 204 may make parking difficult or time-consuming. The system described herein may provide an alternative parking location suggestion to avoid the congestion around the destination point 204. There may be a suggested area 212 where the vehicles around the suggested area 212 drive at a faster speed, as indicated by the longer arrow 208. The suggested area 212 may be presented to the driver as a suggested parking area given the congestion surrounding the destination point 204. The route from the starting point 202 to the destination point 204 may be changed to a new destination 210 where the driver may be more easily able to park the vehicle.

The vehicle speed data may be used in conjunction with the vehicle location data of FIG. 1 to determine the parking condition data. For example, when the vehicle speed data indicates that vehicles along a street are travelling at relatively high speeds, this may be because it is an area generally free of vehicles or an area that has so many densely parked vehicles along the street that the vehicles driving by do not bother to slow down to search for open spots. The vehicle location data may be used to verify whether the particular area is generally free of vehicles or whether the particular area has already been densely occupied with parked vehicles.

Figure 3:
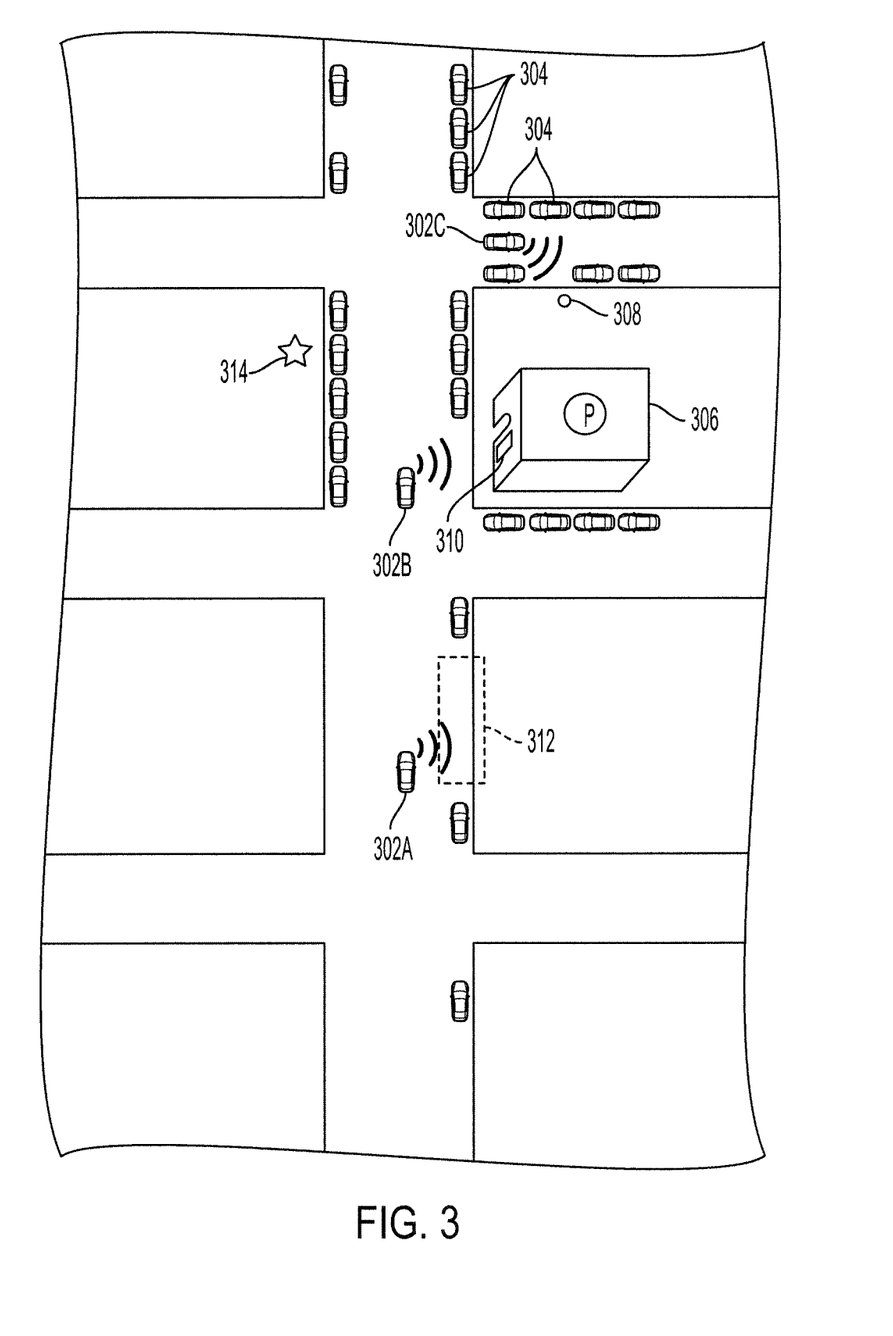
FIG. 3 illustrates traffic condition data including open parking location data, parking regulation data, and parking structure data, according to various embodiments of the invention.

FIG. 3 illustrates a street having parked vehicles 304 and driving vehicles 302. The driving vehicles 302 include, for example, a first vehicle 302A, a second vehicle 302B, and a third vehicle 302C. One or more of the driving vehicles 302 are looking for parking. The driving vehicles 302 may have sensors configured to detect parking condition data around the respective vehicle, and each of the multiple driving vehicles 302 may communicate the detected parking condition data to one or more vehicles or computing devices. The sensors of the driving vehicles 302 may include a spatial sensor, such as RADAR or LIDAR, configured to detect spatial data of the environment around the vehicle. The sensors of the driving vehicles 302 may also include image sensors, such as cameras, configured to detect image data of the environment around the vehicle.

The first vehicle 302A may use the spatial sensor and/or the image sensor to detect open parking location data indicating that there is an open parking spot at location 312. The first vehicle 302A may be configured to detect that a parking spot is open at location 312 based on the presence of vehicles along the side of the road and the presence of a gap between the vehicles where the gap exceeds a threshold distance or area (e.g., a length and a width capable of parking a vehicle). The first vehicle 302A may be configured to detect the area or size of the available space based on the image data and/or the spatial data, and the first vehicle 302A may be configured to automatically determine whether the first vehicle 302A is able to park or fit in the available space.

The first vehicle 302A may be configured to determine a curb color based on the image data, and the first vehicle 302A may be configured to automatically determine whether the first vehicle 302A is able to park in the available space. For example, the available space may have a yellow curb color, and in the jurisdiction where the available space is located the parking restriction data may indicate that a yellow curb is a 10-minute loading zone from 7 AM to 6 PM, and non-loading, non-restricted parking in all other hours. The parking restriction data may be stored in a memory of the first vehicle 302A or in a remote memory accessible to the first vehicle 302A.

In some embodiments, the first vehicle 302A is not looking for parking, and the first vehicle 302A may communicate the open parking location data to one or more other vehicles or computing devices. The open parking location data may include data associated with the available parking space, such as a size of the parking space and any detected restrictions associated with the parking space. In some embodiments, a vehicle that will not fit the open parking space (i.e., too small) will automatically not consider the open parking space as a possible option for parking.

The open parking location data may be associated with one or more locations of open parking spaces. Each open parking space detected by the first vehicle 302A may be associated with a time, and a vehicle receiving the open parking location data may determine a likelihood of the parking space remaining open based on an elapsed time since detection by the first vehicle 302A. For example, an open parking space is detected by a first vehicle at 10:02 AM in a relatively busy area, and the open parking location data is communicated from the first vehicle to a second vehicle. The second vehicle may not be able to arrive at the open parking space until 10:29 AM. Based on historical and/or current traffic patterns in the area surrounding the open parking space, the second vehicle may determine that there is a low (e.g., 7%) chance of the open parking space remaining open at 10:29 AM. The second vehicle may take this probability into consideration when determining whether to go to the open parking location or a different possible parking location.

The second vehicle 302B may use the spatial sensor and/or the image sensor to detect a parking structure 306. The second vehicle 302B may also use the spatial sensor and/or the image sensor to detect parking structure data. In some situations, a parking structure 306 may have information associated with the parking structure on a display 310 on or near the front of the parking structure 306. In some embodiments, the parking structure 306 has a parking spot tracking system that monitors the number of occupied and vacant parking spots within the parking structure 306 and the locations of the occupied and vacant parking spots within the parking structure 306. The parking spot tracking system can transmit this information (i.e., the number and the locations) to the second vehicle 302B. The display 310 may provide a number of available spots in the parking structure and at which levels those spots are located. In some embodiments, the display 310 provides a cost of parking in the parking structure 306 (e.g., $5 per 15 minutes with a maximum of $30). The display 310 can also provide multiple parking options with the prices so the driver can determine where to park.

In some embodiments, the display 310 provides a maximum capacity of the parking structure 306. In these embodiments, a counter may be maintained that keeps track of the number of vehicles entering and exiting the parking structure. The counter may be maintained in a distributed manner using the image sensors of vehicles in proximity of the entrances and exits of the parking structure 306. For example, the image sensors of vehicles in proximity of the entrances and exits of the parking structure 306 may communicate to each other or to a central server, when a vehicle is detected as entering the parking structure 306 or exiting the parking structure 306 and an identifier of the vehicle, such as the license plate number or the detected make and model of the vehicle. The identifier is used to ensure that a single vehicle is not double counted. In some embodiments, vehicles which are parked within the parking structure 306 in proximity of the entrances and exits of the parking structure 306 are responsible for maintaining the distributed counter because these vehicles may be in the best position to detect vehicles entering and exiting the parking structure 306.

The second vehicle 302B may distribute the detected parking structure data to one or more vehicles or computing devices to provide information about the parking structure 306. For example, the first vehicle 302A may desire to go to a destination location 314. The first vehicle 302A may park at the available parking location 312 or may park in the parking structure 306. The first vehicle 302A may receive the parking structure data from the second vehicle 302B in order to make a more informed and more efficient decision of where to park. If the parking structure data indicates that parking in the parking structure 306 is cheap and plentiful, the first vehicle 302A may choose to park in the parking structure 306. However, if the parking structure data indicates that parking in the parking structure 306 is sparse and expensive, the first vehicle 302A may decide to park in the available spot 312. In some embodiments, when the first vehicle 302A is autonomously driven, the decision making of where to park is automatically performed by one or more processors of the first vehicle 302A. In some embodiments, a recommendation of where to park is made by the first vehicle 302A and incorporated into the navigation instructions provided to the driver of the first vehicle 302A. The autonomous vehicle can also be programmed to go to the least expensive parking structure for parking.

Conventionally, the driver of the first vehicle 302A would drive past the available parking location 312 to investigate the parking situation at the parking structure 306. The driver of the first vehicle 302A may have then discovered that the parking in the parking structure 306 was sparse, and may return back to the parking location 312, only to find that it has since been occupied by another vehicle. Using the systems and methods described herein, the driver of the first vehicle 302A would be able to more efficiently park the first vehicle 302A, and there would be, in aggregate, less congestion.

In some embodiments, the second vehicle 302B relies on its spatial sensor and/or image sensor as well as the spatial data and/or the image data from other vehicles to determine the parking structure data associated with the parking structure 306. In some embodiments, the second vehicle 302B is configured to communicate with a computing device associated with the parking structure 306, which provides the parking structure data to the second vehicle 302B. In some embodiments, the parking structure data from the computing device associated with the parking structure 306 may additionally include the specific locations and sizes of the available parking spots in the parking structure 306. A vehicle receiving the parking structure data may navigate the driver of the vehicle to the open parking spot based on the parking structure data from the computing device associated with the parking structure 306.

The third vehicle 302C may use the spatial sensor and/or the image sensor to detect parking regulation data associated with a parking regulation object 308. The parking regulation object 308 may be a parking sign, and the parking regulation data may be parking sign data indicating situations where parking is allowed or not allowed. The parking regulation object 308 may be a parking meter, and the parking regulation data may be parking meter data indicating the presence of a parking meter, any limitations associated with the parking meter (e.g., a two-hour limit), and/or a status of the parking meter (e.g., unpaid or paid for the next 17 minutes).

In some situations, when the parking regulation object is a parking sign, the parking sign may have a series of situations where vehicles are allowed to park, and another series of situations where vehicles are not allowed to park, and determining whether at a given day and time a vehicle is allowed to park may be difficult to determine. For example, the parking sign may include multiple signs reading, "No Parking 11 AM-1 PM Tuesday Street Cleaning," "Tow Away School Days, No Stopping Monday through Friday, 7 AM-4 PM," "School Days Exceptions 15 Minute Parking Monday through Friday, 7:30 AM-8:30 AM School Business," "1 Hour Parking Monday through Friday 4 PM-6 PM," "1 Hour Parking Non-School Days, Sunday 12 Midnight through Friday 6 PM," "No Stopping Friday 6 PM-Sunday 12 Midnight." It may be confusing for a human being to interpret these signs, but a computing device with data regarding how various parking sign words are interpreted may be able to more accurately and more rapidly determine whether a vehicle may park there at any given day and time. The image data associated with the one or more parking signs are analyzed by the one or more processors of the third vehicle 302C and may automatically inform the driver whether the vehicle may be parked.

In some embodiments, the third vehicle 302C is configured to communicate with the parking regulation object 308 and receive the parking regulation data. For example, the parking regulation object 308 may be a network connected parking meter configured to communicate to the third vehicle 302C the parking regulation data including an amount of paid time remaining on the parking meter and any restrictions on parking.

The third vehicle 302C may communicate the parking regulation data to one or more other vehicles (e.g., the first vehicle 302A and/or the second vehicle 302B) or other computing devices. Any of the vehicles 302 may be able to make better informed, more efficient parking decisions when provided with parking condition data (e.g., open parking location data, parking structure data, parking regulation data, and/or dimensions (e.g., length and width) of the open parking space) from other vehicles.

In determining a suggested parking location, a convenience level may be determined for each candidate parking spot of a plurality of candidate parking spots. The convenience level for a given spot may be determined based on the distance to the destination, an availability probability (i.e., likelihood of the available parking spot remaining available by the time the vehicle arrives at the available parking spot), a size of the parking spot, any restrictions associated with the parking spot, and/or any costs associated with the parking spot. For example, a first candidate parking spot may be along a street and within 50 feet of the destination, but the size of the first candidate parking spot may be small, and the cost of paying for the meter corresponding to the first candidate parking spot may be high, e.g., $5 for 2 hours. A second candidate parking spot may be at a parking structure within 200 feet of the destination with relatively large parking spaces, but the cost of parking in the parking structure is $10 for 2 hours. The convenience level associated with the first candidate parking spot may be 78 out of 100, and the convenience level associated with the second candidate parking spot may be 88 out of 100. Accordingly, the second candidate parking spot may be recommended. The user or driver of the vehicle may adjust the weights associated with each factor of the convenience level according to their preferences.

Figure 4:
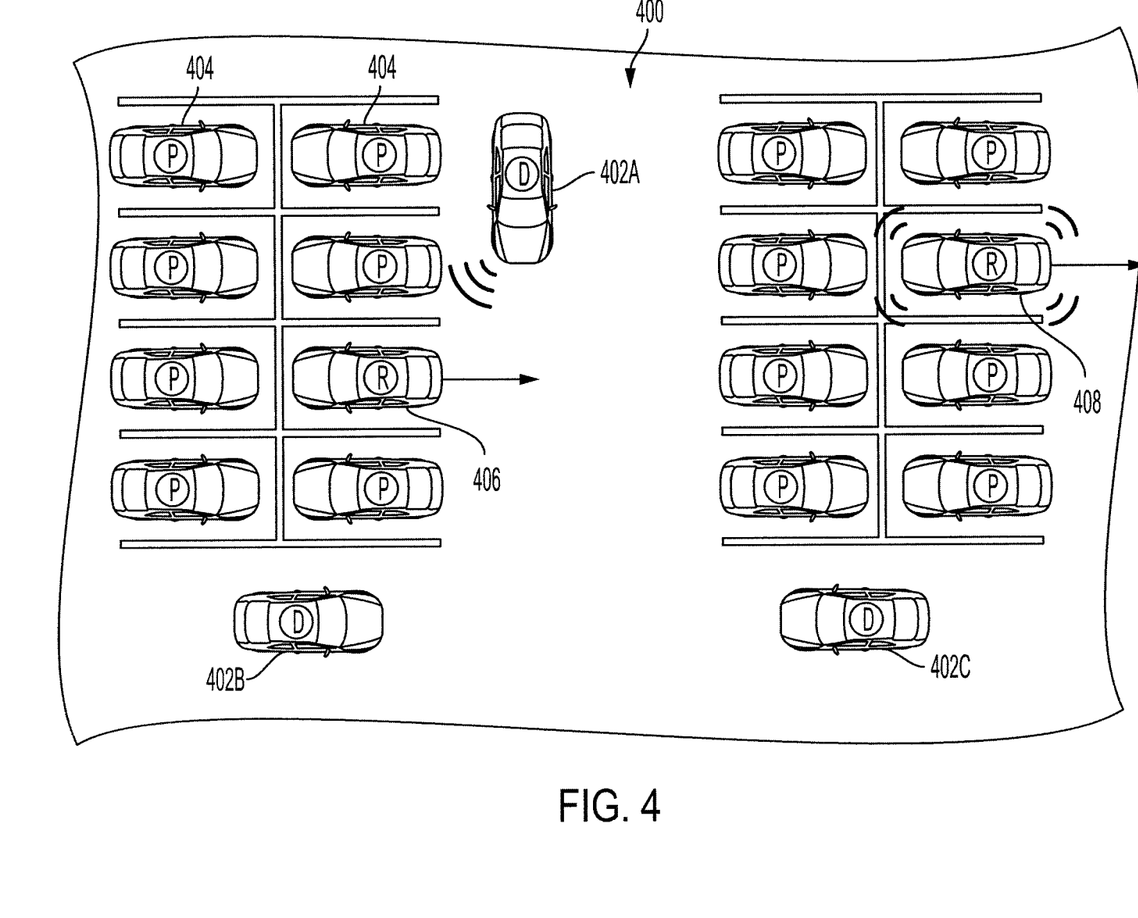
FIG. 4 illustrates communicating of open parking spaces between vehicles, according to various embodiments of the invention.

FIG. 4 illustrates a parking lot 400 with driving vehicles 402, parked vehicles 404, and reversing vehicles 406.

The first vehicle 402A may use spatial sensors and/or image sensors to detect that the reversing vehicle 406 is vacating a parking spot. The first vehicle 402A may use machine learning techniques to train one or more processors of the first vehicle 402A to detect when a vehicle is vacating a parking spot based on the spatial data and/or the image data. In some embodiments, the reverse lights or persons entering the vehicle may be used to detect that a particular vehicle is likely vacating a parking spot. In some embodiments, the moving of a vehicle (e.g., vehicle 406) from between two other vehicles may be used to detect that a particular vehicle is likely vacating a parking spot. The two other adjacent vehicles may be in front of and behind the moving vehicle or to the sides of the moving vehicle.

The first vehicle 402A may communicate the potential opening of the parking spot and the location of the parking spot to one or more vehicles (e.g., second vehicle 402B or third vehicle 402C) or a computing device (e.g., a computing device associated with the parking lot 400 and configured to monitor vacancies and occupancies of parking spots in the parking lot 400).

In some embodiments, a vehicle 408 vacating a parking spot may broadcast to one or more other vehicles in the vicinity that it is vacating a parking spot. The vehicle 408 may also communicate the location of the parking spot to the one or more other vehicles. In some embodiments, only vehicles that are not parked are available to receive the parking data communicated from any other vehicle. In some embodiments, any of the vehicles described herein may use data from other vehicles and/or data from infrastructure (e.g., network connected parking structures or network connected parking meters) to determine where to park.

Figure 5:
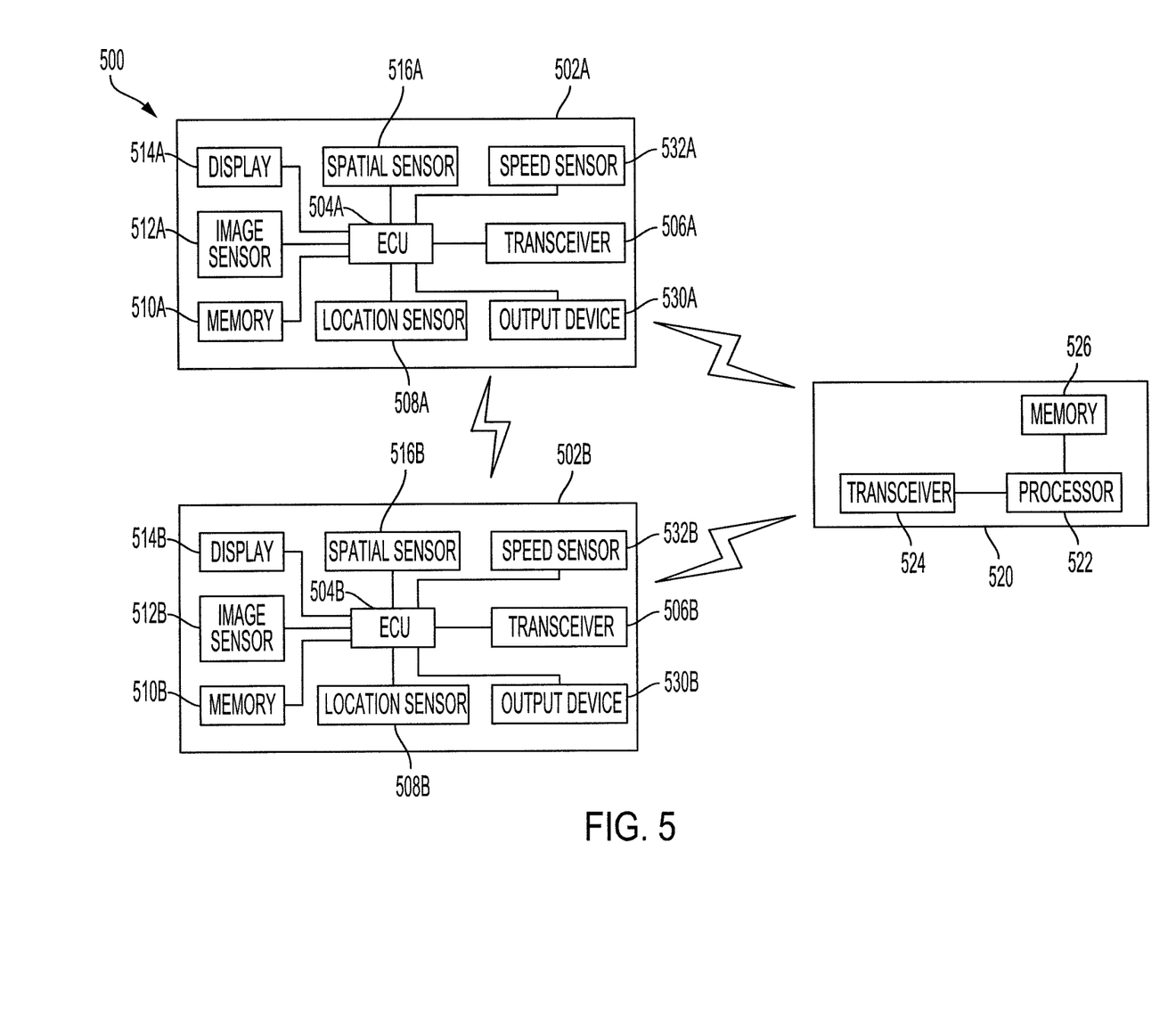
FIG. 5 illustrates the components of the system, according to various embodiments of the invention.

FIG. 5 illustrates a block diagram of the system 500. The system 500 includes a first vehicle 502A and a second vehicle 502B. Components having a letter suffix may be referred to collectively or individually by the number before the letter suffix. For example, vehicle 502 may refer to the first vehicle 502A and the second vehicle 502B collectively or may refer to either the first vehicle 502A or the second vehicle 502B individually. The vehicles 502 may be similar to any of the vehicles described herein, such as vehicles 102, vehicles 302A-302C, vehicles 402A-402C, vehicle 404, vehicle 406, or vehicle 408).

The vehicle 502 may have an automatic or manual transmission. The vehicle 502 is a conveyance capable of transporting a person, an object, or a permanently or temporarily affixed apparatus. The vehicle 502 may be a self-propelled wheeled conveyance, such as a car, a sports utility vehicle, a truck, a bus, a van or other motor or battery driven vehicle. For example, the vehicle 502 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 502 may be semi-autonomous vehicle or an autonomous vehicle. That is, the vehicle 502 may be self-maneuvering and navigate without human input. An autonomous vehicle may use one or more sensors and/or a navigation unit to drive autonomously.

The vehicle 502 (e.g., first vehicle 502A and second vehicle 502B) includes an ECU 504 (e.g., ECU 504A and 504B) connected to a transceiver 506 (e.g., 506A and 506B), a location sensor 508 (e.g., 508A and 508B), a memory 510 (e.g., 510A and 510B), an image sensor 512 (e.g., 512A and 512B), a display 514 (e.g., 514A and 514B), a spatial sensor 516 (e.g., 516A and 516B), an output device 530 (e.g., 530A and 530B), and a speed sensor 532 (e.g., 532A and 532B). The ECU 504 may be one or more ECUs, appropriately programmed, to control one or more operations of the vehicle. The one or more ECUs 504 may be implemented as a single ECU or in multiple ECUs. The ECU 504 may be electrically coupled to some or all of the components of the vehicle. In some embodiments, the ECU 504 is a central ECU configured to control one or more operations of the entire vehicle. In some embodiments, the ECU 504 is multiple ECUs located within the vehicle and each configured to control one or more local operations of the vehicle. In some embodiments, the ECU 504 is one or more computer processors or controllers configured to execute instructions stored in a non-transitory memory 510.

The vehicle 502 may be coupled to a network. The network, such as a local area network (LAN), a wide area network (WAN), a cellular network, a digital short-range communication (DSRC), the Internet, or a combination thereof, connects the vehicle 502 to a remote device 520.

The transceiver 506 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G or 5G). The transceiver 506 may transmit data to and receive data from devices and systems not physically connected to the vehicle. For example, the ECU 504 may communicate with the remote device 520 or with ECUs of other vehicles. Furthermore, the transceiver 506 may access the network, to which the remote device 520 or other vehicles are also connected.

The location sensor 508 is connected to the ECU 504 and configured to detect location data. The location sensor 508 may be a GPS unit. The ECU 504 may use the location data along with map data stored in memory 510 to determine a location of the vehicle. In other embodiments, the location sensor 508 has access to the map data and may determine the location of the vehicle and provide the location of the vehicle to the ECU 504.

The memory 510 is connected to the ECU 504 and may be connected to any other component of the vehicle. The memory 510 is configured to store any data described herein, such as the location data of the vehicle, vehicle location data of other vehicles, vehicle speed data of other vehicles, parking structure data, open parking location data, threshold parking congestion level, threshold convenience level, parking restriction data, and any data received from the remote device 520 or other vehicles via the transceiver 506 of the vehicle 502.

The vehicle 502 also includes an image sensor 512 configured to detect image data. The image sensor 512 may be one or more cameras configured to detect images of the environment outside of the vehicle 502. The image data may be used by the ECU 504 to determine whether a vehicle is leaving a parking spot, thereby creating an open parking spot. The image data may be used by the ECU 504 to determine parking structure data associated with a parking structure. The image data may be used by the ECU 504 to determine parking regulation or parking restriction data.

The vehicle 502 also includes a spatial sensor 516 configured to detect spatial data. The spatial sensor 516 may be one or more spatial detection devices, such as RADAR or LIDAR configured to detect an environment outside of the vehicle 502. The spatial data may be used by the ECU 504 to determine whether an open parking space is present.

The vehicle 502 also includes a display 514. The display 514 may display navigation instructions from a starting location to a destination location. The display 514 may also display settings associated with parking preferences and any of the thresholds described herein. The display 514 may be a touchscreen configured to receive user input via one or more selectable icons. For example, the display 514 may display a selectable icon for indicating a parking congestion sensitivity of the user, which may be used to adjust the threshold parking congestion level described herein.

Parking condition data may be communicated directly from one vehicle to another (e.g., from a first vehicle 502A to a second vehicle 502B). The vehicle receiving the parking condition data may supplement the parking condition data with additional parking condition data detected using one or more onboard sensors and may then pass on the supplemented parking condition data to one or more other vehicles. The parking condition data may be communicated from the vehicle 502 to the remote device 520 via the transceiver 506 of the vehicle 502 and the transceiver 524 of the remote device 520. The remote device 520 may then broadcast the parking condition data to one or more vehicles.

The remote device 520 may be a remote data server configured to receive and distribute parking data. The remote device 520 may be a computing device associated with a building (e.g., a parking structure) or a parking device (e.g., a parking meter). The remote device 520 includes a processor 522 connected to a transceiver 524 and a memory 526. The processor 522 (and any processors described herein) may be one or more computer processors configured to execute instructions stored on a non-transitory memory.

The memory 526 may be a non-transitory memory. When the remote device 520 is a remote data server for receiving and distributing parking condition data, the memory 526 may be configured to store the parking condition data received from one or more vehicle 502. When the remote device 520 is a computing device associated with a parking structure, the memory 526 may be configured to store the parking structure data. When the remote device 520 is a computing device associated with a parking device (e.g., a parking meter), the memory 526 may be configured to store the parking device data (e.g., amount of money or time left on the parking meter, a maximum parking time length, any parking restrictions associated with the parking spot of the parking meter). The transceiver 524 may be configured to transmit and receive data, similar to the transceiver 506.

When the remote device 520 is a remote data server, the processor 522 may be configured to receive the parking condition data from a plurality of vehicles and determine one or more vehicles to distribute the parking condition data to. The processor 522 may be configured to combine the parking condition data received from the plurality of vehicles.

When the remote device 520 is a computing device associated with a parking structure, the processor 522 may be configured to use one or more sensors within the parking structure to maintain an accounting of occupied and empty spaces in the parking structure. The one or more sensors used may be weight sensors, image sensors, or laser sensors used to detect the presence of a vehicle in a parking spot, or may be image sensors used to detect and identify vehicles entering and exiting the parking structure.

When the remote device 520 is a computing device associated with a parking meter, the processor 522 may be configured to monitor the corresponding parking spot to determine the presence of a vehicle. The processor 522 may receive a request for parking meter data associated with the parking spot and the parking meter, and the processor 522 may communicate the parking meter data to the requesting computing device.

As used herein, a "unit" may refer to hardware components, such as one or more computer processors, controllers, or computing devices configured to execute instructions stored in a non-transitory memory.

Figure 6:
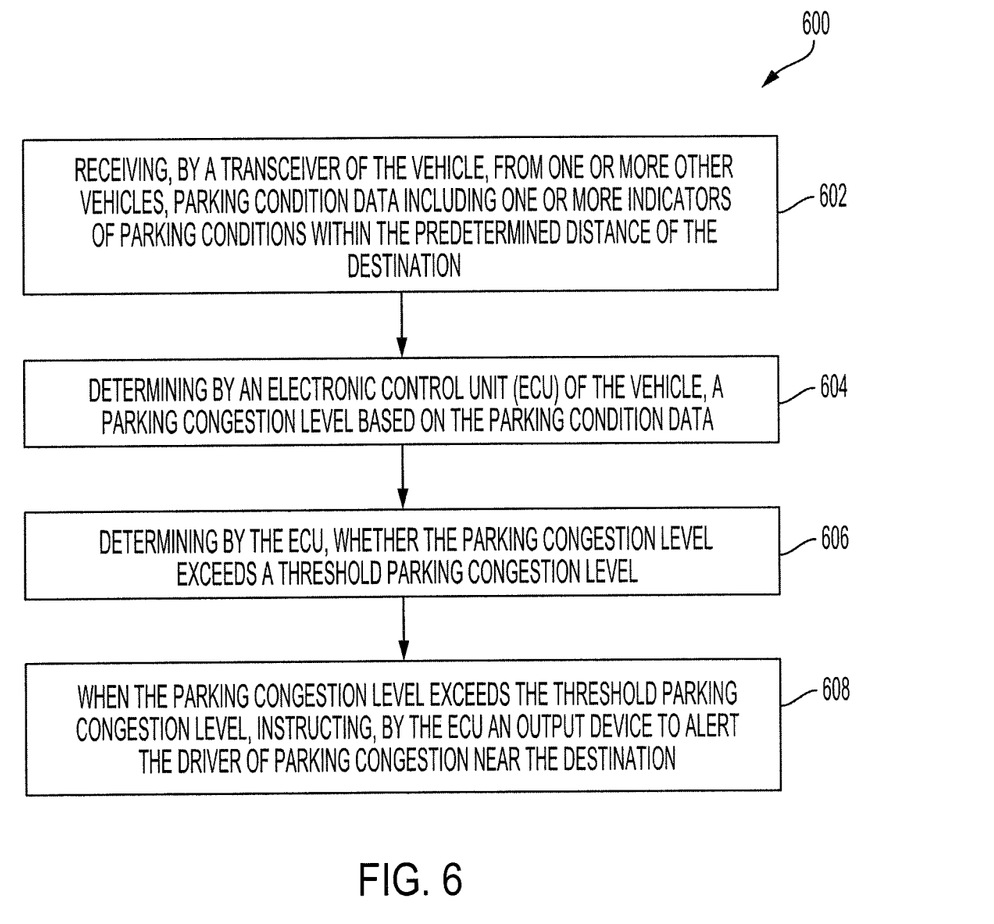
FIG. 6 illustrates a flow diagram of a process for alerting a driver of parking congestion, according to various embodiments of the invention.

FIG. 6 is a flow diagram of a process 600 for alerting a driver of a vehicle of parking conditions within a predetermined distance of a destination.

A transceiver (e.g., transceiver 506) of the vehicle (e.g., vehicle 502) receives, from one or more other vehicles (e.g., vehicle 502), parking condition data including one or more indicators of parking conditions within the predetermined distance of the destination (step 602). The parking condition data may include vehicle location data of a plurality of vehicles (e.g., vehicle 502) within the predetermined distance of the destination, and the vehicle location data may be detected by respective location sensors (e.g., location sensor 508) of the plurality of vehicles. The parking condition data may include vehicle speed data of the plurality of vehicles within the predetermined distance of the destination, the vehicle speed data detected by respective speed sensors (e.g., speed sensor 532) of the plurality of vehicles.

The parking condition data may include parking structure data associated with a parking structure (e.g., parking structure 306) within the predetermined distance of the destination, the parking structure data detected by an image sensor (e.g., image sensor 512) of a vehicle (e.g., vehicle 502) proximal to the parking structure or transmitted by a computing device (e.g., remote device 520) associated with the parking structure, the parking structure data including at least one of number of available parking spaces and a cost of parking in the parking structure.

As described herein, the number of available parking spaces may be indicated on a sign in front of the parking structure, provided by the computing device associated with the parking structure, or determined by one or more vehicles detecting entering and exiting of vehicles from the parking structure and comparing the detected entering and exiting vehicles to a capacity of the parking structure.

An ECU (e.g., ECU 504) of the vehicle determines a parking congestion level based on the parking condition data (step 604). The parking congestion level may be a value associated with the parking conditions within a predetermined distance of the destination. The process used to determine the parking congestion level may be based on any of the data of the parking condition data, and the weights of each of the data may be adjusted to more accurately represent the condition of parking near the destination. The weights of each of the data may be adjusted by the driver or user of the vehicle, or may be adjusted by the vehicle manufacturer or a third party.

The ECU determines whether the parking congestion level exceeds a threshold parking congestion level (step 606). The threshold parking congestion level may be stored in a memory (e.g., memory 510) in the vehicle. The threshold parking congestion level may be adjusted by the user or driver of the vehicle based on their preferences and tolerance for parking congestion. A lowered threshold parking congestion level may be associated with a lower tolerance for parking congestion near the destination. A higher threshold parking congestion level may be associated with a higher tolerance for parking congestion near the destination. Any of the adjustments made by the user or driver of the vehicle may be made by an input unit of the vehicle, such as a touchscreen, keyboard, or microphone.

When the parking congestion level exceeds the threshold parking congestion level, the ECU instructs an output device (e.g., output device 530) to alert the driver of parking congestion near the destination (step 608). The output device may be a display screen configured to visually provide the alert to the driver, a speaker configured to audibly provide the alert to the driver, or a vibration unit configured to tactilely provide the alert to the driver.

Figure 7:
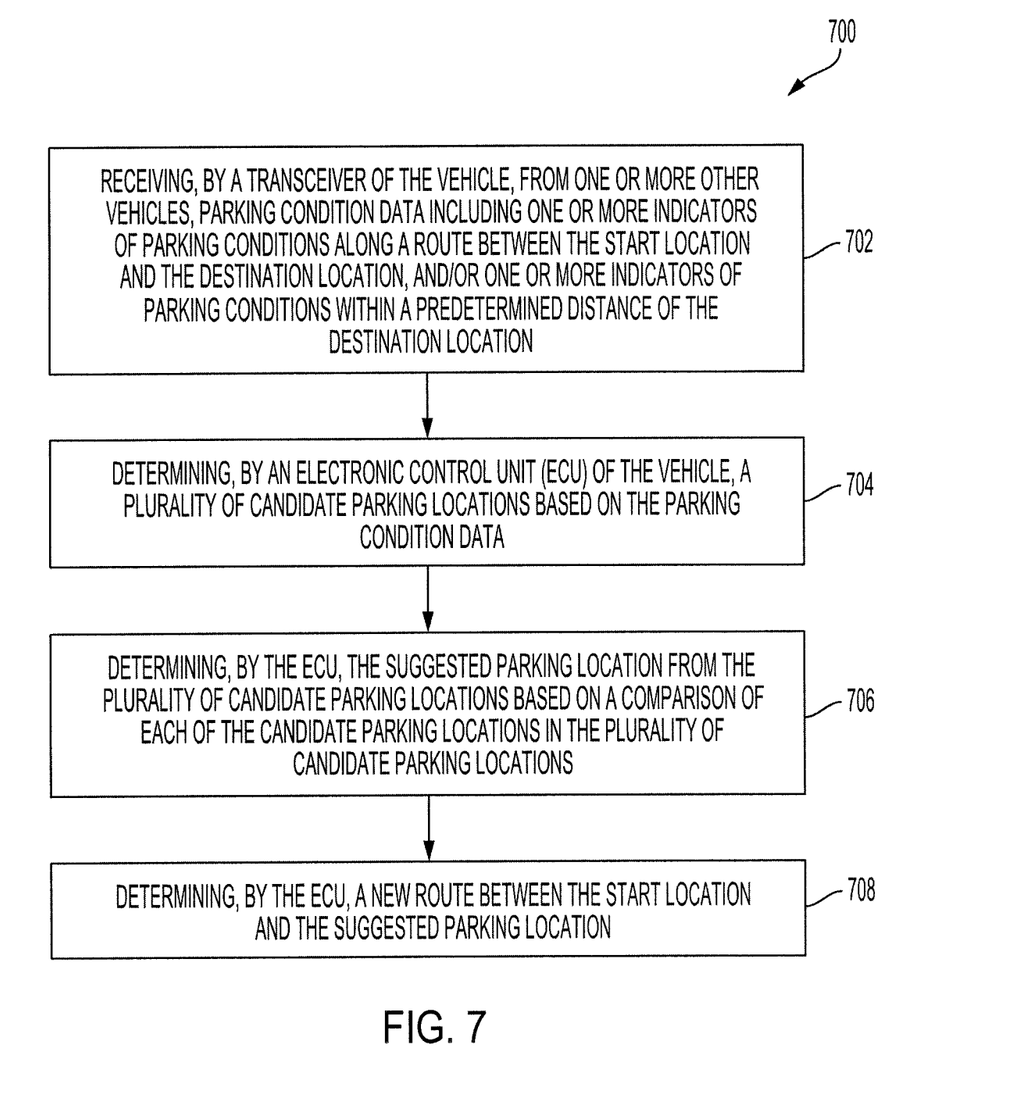
FIG. 7 illustrates a flow diagram of a process for providing an alternate parking location, according to various embodiments of the invention.

FIG. 7 is a flow diagram of a process 700 for determining a suggested parking location for a vehicle travelling from a start location to a destination location.

A transceiver (e.g., transceiver 506) of the vehicle (e.g., vehicle 502) receives, from one or more other vehicles (e.g., vehicle 502), parking condition data including one or more indicators of parking conditions along a route between the start location and the destination location, and/or one or more indicators of parking conditions within a predetermined distance of the destination location (step 702).

The parking condition data may include vehicle location data of a plurality of vehicles (e.g., vehicle 502) along the route between the start location and the destination location, and/or within the predetermined distance of the destination location. The vehicle location data may be detected by respective location sensors (e.g., location sensor 508) of the plurality of vehicles.

The parking condition data may include vehicle speed data of the plurality of vehicles along the route between the start location and the destination location, and/or within the predetermined distance of the destination location, the vehicle speed data detected by respective speed sensors (e.g., speed sensor 532) of the plurality of vehicles.

The parking condition data may include parking structure data associated with a parking structure (e.g., parking structure 306) along the route between the start location and the destination location, and/or within the predetermined distance of the destination location, the parking structure data detected by an image sensor (e.g., image sensor 512) of a vehicle (e.g., vehicle 502) proximal to the parking structure or transmitted by a computing device (e.g., remote device 520) associated with the parking structure, the parking structure data including at least one of number of available parking spaces and a cost of parking in the parking structure.

As described herein, the number of available parking spaces may be indicated on a sign in front of the parking structure, provided by the computing device associated with the parking structure, or determined by one or more vehicles detecting entering and exiting of vehicles from the parking structure and comparing the detected entering and exiting vehicles to a capacity of the parking structure.

The parking condition data may include open parking location data determined by the one or more other vehicles (e.g., vehicle 502) based on image data detected by respective image sensors (e.g., image sensor 512) of the one or more other vehicles and/or spatial data detected by respective spatial sensors (e.g., spatial sensor 516) of the one or more other vehicles. In some embodiments, the open parking location data is determined by detecting at least one of reverse lights being turned on by a vehicle exiting a parking space, a vehicle leaving a location between two other vehicles, or a space between two vehicles that exceeds a vehicle size threshold.

An ECU (e.g., ECU 504) of the vehicle determines a plurality of candidate parking locations based on the parking condition data (step 704). In some embodiments, a convenience level for each of the candidate parking locations in the plurality of candidate parking locations is determined by the ECU. The convenience level may be based on a distance to the destination location, an availability probability, a parking size, parking restriction data, and/or a parking cost. In some embodiments, a parking congestion level of the destination location is initially determined by the ECU, as described herein, and when the parking congestion level of the destination location exceeds a threshold parking congestion level, the plurality of candidate parking locations is determined and each candidate parking location is evaluated.

The ECU determines the suggested parking location from the plurality of candidate parking locations based on a comparison of each of the candidate parking locations in the plurality of candidate parking locations (step 706). The comparison may be made based on the convenience level of each candidate parking location, as described herein.

The ECU determines a new route between the start location and the suggested parking location (step 708). In some embodiments, a display screen then displays the new route between the start location and the suggested parking location. In some embodiments, the ECU is further configured to autonomously drive the vehicle to the suggested parking location, when the vehicle is an autonomous vehicle.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for alerting a driver of a vehicle of parking conditions within a predetermined distance of a destination, the system comprising:
    a transceiver of the vehicle configured to receive, from one or more other vehicles, parking condition data including vehicle speed data corresponding to a plurality of vehicles located within the predetermined distance of the destination;
    an electronic control unit (ECU) of the vehicle connected to the transceiver and configured to:
        determine a parking congestion level based on the vehicle speed data,
        determine whether the parking congestion level exceeds a threshold parking congestion level, and
        when the parking congestion level exceeds the threshold parking congestion level, instruct an output device to alert the driver of parking congestion near the destination.

2. The system of claim 1, wherein the parking condition data includes vehicle location data of the plurality of vehicles within the predetermined distance of the destination, the vehicle location data detected by respective location sensors of the plurality of vehicles.

3. The system of claim 1, wherein the parking condition data includes parking structure data associated with a parking structure within the predetermined distance of the destination, the parking structure data detected by an image sensor of a vehicle proximal to the parking structure or transmitted by a computing device associated with the parking structure, the parking structure data including at least one of number of available parking spaces and a cost of parking in the parking structure.

4. The system of claim 3, wherein the number of available parking spaces is determined by one or more vehicles detecting entering and exiting of vehicles from the parking structure and comparing the detected entering and exiting vehicles to a capacity of the parking structure.

5. The system of claim 1, wherein the output device is a display screen configured to visually provide the alert to the driver, a speaker configured to audibly provide the alert to the driver, or a vibration unit configured to tactilely provide the alert to the driver.

6. The system of claim 1, wherein the parking condition data further includes vehicle location data and parking structure data, and
    wherein the ECU determines the parking congestion level based on a weighted sum of the vehicle location data, the vehicle speed data, and the parking structure data.

7. A vehicle comprising:
    a transceiver configured to receive, from one or more other vehicles, parking condition data including vehicle speed data corresponding to a plurality of vehicles located within a predetermined distance of a destination;
    an electronic control unit (ECU) connected to the transceiver and configured to:
        determine a parking congestion level based on the vehicle speed data,
        determine whether the parking congestion level exceeds a threshold parking congestion level, and when the parking congestion level exceeds the threshold parking congestion level, instruct an output device to alert the driver of parking congestion near the destination.

8. The vehicle of claim 7, wherein the parking condition data includes vehicle location data of the plurality of vehicles within the predetermined distance of the destination, the vehicle location data detected by respective location sensors of the plurality of vehicles.

9. The vehicle of claim 7, wherein the parking condition data includes parking structure data associated with a parking structure within the predetermined distance of the destination, the parking structure data detected by an image sensor of a vehicle proximal to the parking structure or transmitted by a computing device associated with the parking structure, the parking structure data including at least one of number of available parking spaces and a cost of parking in the parking structure.

10. The vehicle of claim 9, wherein the number of available parking spaces is determined by one or more vehicles detecting entering and exiting of vehicles from the parking structure and comparing the detected entering and exiting vehicles to a capacity of the parking structure.

11. The vehicle of claim 7, wherein the output device is a display screen configured to visually provide the alert to the driver, a speaker configured to audibly provide the alert to the driver, or a vibration unit configured to tactilely provide the alert to the driver.

12. The vehicle of claim 7, wherein the parking condition data further includes vehicle location data and parking structure data, and
wherein the ECU determines the parking congestion level based on a weighted sum of the vehicle location data, the vehicle speed data, and the parking structure data.

13. A method for alerting a driver of a vehicle of parking conditions within a predetermined distance of a destination, the method comprising:
receiving, by a transceiver of the vehicle, from one or more other vehicles, parking condition data including vehicle speed data corresponding to a plurality of vehicles located within the predetermined distance of the destination;
determining, by an electronic control unit (ECU) of the vehicle, a parking congestion level based on the vehicle sped data;
determining, by the ECU, whether the parking congestion level exceeds a threshold parking congestion level; and
alerting the driver of parking congestion near the destination, by an output device, when the parking congestion level exceeds the threshold parking congestion level.

14. The method of claim 13, wherein the parking condition data includes vehicle location data of a plurality of vehicles within the predetermined distance of the destination, the vehicle location data detected by respective location sensors of the plurality of vehicles.

15. The method of claim 13, wherein the parking condition data includes parking structure data associated with a parking structure within the predetermined distance of the destination, the parking structure data detected by an image sensor of a vehicle proximal to the parking structure or transmitted by a computing device associated with the parking structure, the parking structure data including at least one of number of available parking spaces and a cost of parking in the parking structure.

16. The method of claim 15, further comprising determining the number of available parking spaces using one or more vehicles detecting entering and exiting of vehicles from the parking structure, and comparing the detected entering and exiting vehicles to a capacity of the parking structure.

17. The method of claim 13, wherein alerting by the output device comprises visually providing the alert to the driver using a display screen, audibly providing the alert to the driver using a speaker, or tactilely providing the alert to the driver using a vibration unit.

* * * * *